US007356198B2

(12) United States Patent
Chauville et al.

(10) Patent No.: US 7,356,198 B2
(45) Date of Patent: Apr. 8, 2008

(54) METHOD AND SYSTEM FOR CALCULATING A TRANSFORMED IMAGE FROM A DIGITAL IMAGE

(75) Inventors: Benoit Chauville, Paris (FR); Frederic Guichard, Paris (FR); Jean-Marc Lavest, Clermont Ferrand (FR); Bruno Liege, Paris (FR)

(73) Assignee: DO Labs, Boulogne (FR)

(*) Notice: Subject to any disclaimer, the term of this patent is extended or adjusted under 35 U.S.C. 154(b) by 421 days.

(21) Appl. No.: 10/483,252

(22) PCT Filed: Jun. 5, 2002

(86) PCT No.: PCT/FR02/01907

§ 371 (c)(1),
(2), (4) Date: Jun. 24, 2004

(87) PCT Pub. No.: WO03/007238

PCT Pub. Date: Jan. 23, 2003

(65) Prior Publication Data

US 2004/0247195 A1 Dec. 9, 2004

(30) Foreign Application Priority Data

| | | |
|---|---|---|
| Jul. 12, 2001 | (FR) | 01 09291 |
| Jul. 12, 2001 | (FR) | 01 09292 |
| Oct. 2, 2001 | (FR) | 01 12664 |

(51) Int. Cl.
*G06K 9/40* (2006.01)

(52) U.S. Cl. ....................... 382/275; 382/276; 382/254

(58) Field of Classification Search ................ 382/297, 382/267, 293, 254, 255, 275, 283; 348/231.6
See application file for complete search history.

(56) References Cited

U.S. PATENT DOCUMENTS

| | | | | |
|---|---|---|---|---|
| 4,695,964 | A * | 9/1987 | Seto et al. | 345/427 |
| 5,144,687 | A | 9/1992 | Honda | |
| 5,675,380 | A * | 10/1997 | Florent et al. | 348/251 |
| 6,219,446 | B1 | 4/2001 | Hosaka et al. | |
| 6,538,691 | B1 * | 3/2003 | Macy et al. | 348/222.1 |

(Continued)

FOREIGN PATENT DOCUMENTS

| | | |
|---|---|---|
| WO | 00 07376 | 2/2000 |

OTHER PUBLICATIONS

Watanabe M et al., "An Image Data File Format for Digital Still Camera", Final Program and Advance Printing of Papers. Annual Conference. Imaging on the Information Superhighway, pp. 421-424 1995.

(Continued)

*Primary Examiner*—Samir Ahmed
*Assistant Examiner*—Eric Rush
(74) *Attorney, Agent, or Firm*—Oblon, Spivak, McClelland, Maier & Neustadt, P.C.

(57) ABSTRACT

The invention relates to a system and method for calculating a transformed image from a digital image and formatted information related to a geometric transformation, especially formatted information related to the distortion and/or chromatic aberrations of an appliance chain. This calculation is carried out on the basis of an approximation of the said geometric transformation. The invention is applicable to photographic or video image processing, in optical devices, industrial controls, robotics, metrology, etc.

26 Claims, 9 Drawing Sheets

PXnum.1 INUM PXTR.1 ITR CAPP PXnum.m (pxnum,vxnum) PXTR.m (pxtr, vxtr)

U.S. PATENT DOCUMENTS

| | | | | |
|---|---|---|---|---|
| 6,603,885 | B1 * | 8/2003 | Enomoto | 382/263 |
| 6,810,151 | B2 * | 10/2004 | Liu | 382/275 |
| 6,819,333 | B1 * | 11/2004 | Sadowski | 345/647 |
| 2001/0014180 | A1 * | 8/2001 | Ejiri et al. | 382/275 |

OTHER PUBLICATIONS

U.S. Appl. No. 10/482,413, filed Jan. 12, 2004, Liege et al.
U.S. Appl. No. 10/483,253, filed Jan. 12, 2004, Chauville et al.
U.S. Appl. No. 10/482,419, filed Jan. 12, 2004, Chauville et al.
U.S. Appl. No. 10/483,252, filed Jan. 12, 2004, Chauville et al.
U.S. Appl. No. 10/483,322, filed Jan. 12, 2004, Liege et al.
U.S. Appl. No. 10/483,495, filed Jan. 12, 2004, Chanas et al.
U.S. Appl. No. 10/483,496, filed Jan. 12, 2004, Chanas et al.
U.S. Appl. No. 10/483,494, filed Jan. 12, 2004, Liege et al.
U.S. Appl. No. 10/483,497, filed Jan. 12, 2004, Liege et al.

* cited by examiner

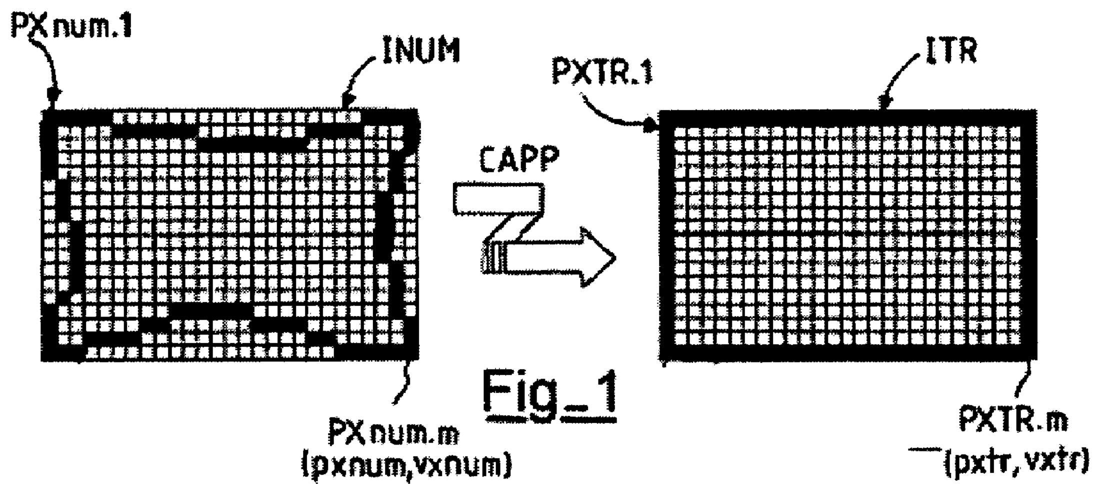
Fig_1
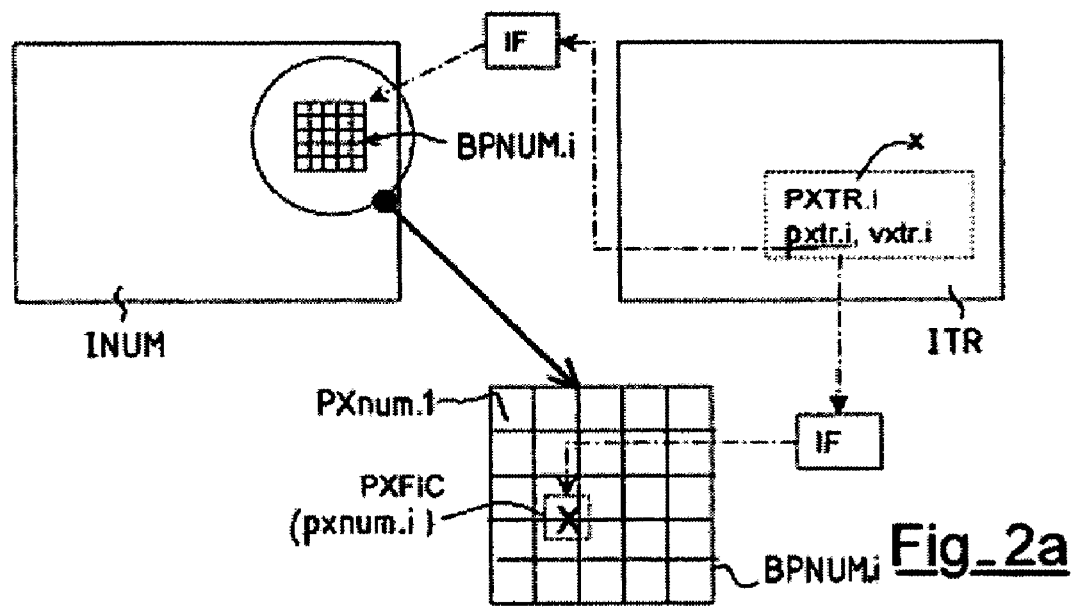
Fig_2a
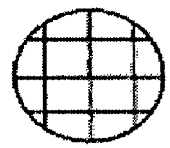
Fig_2b
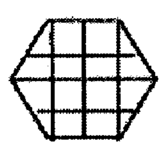
Fig_2c
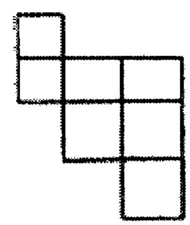
Fig_2d FIG_3
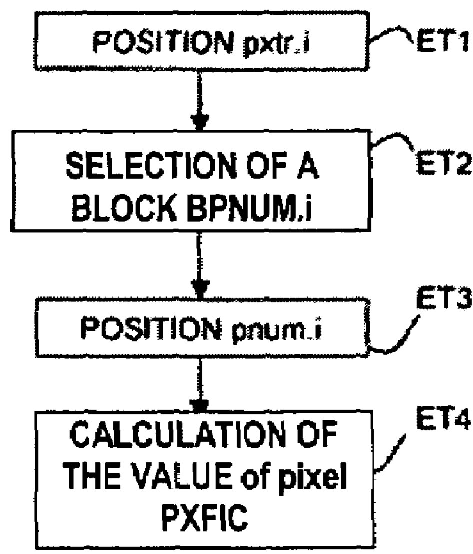
FIG_4
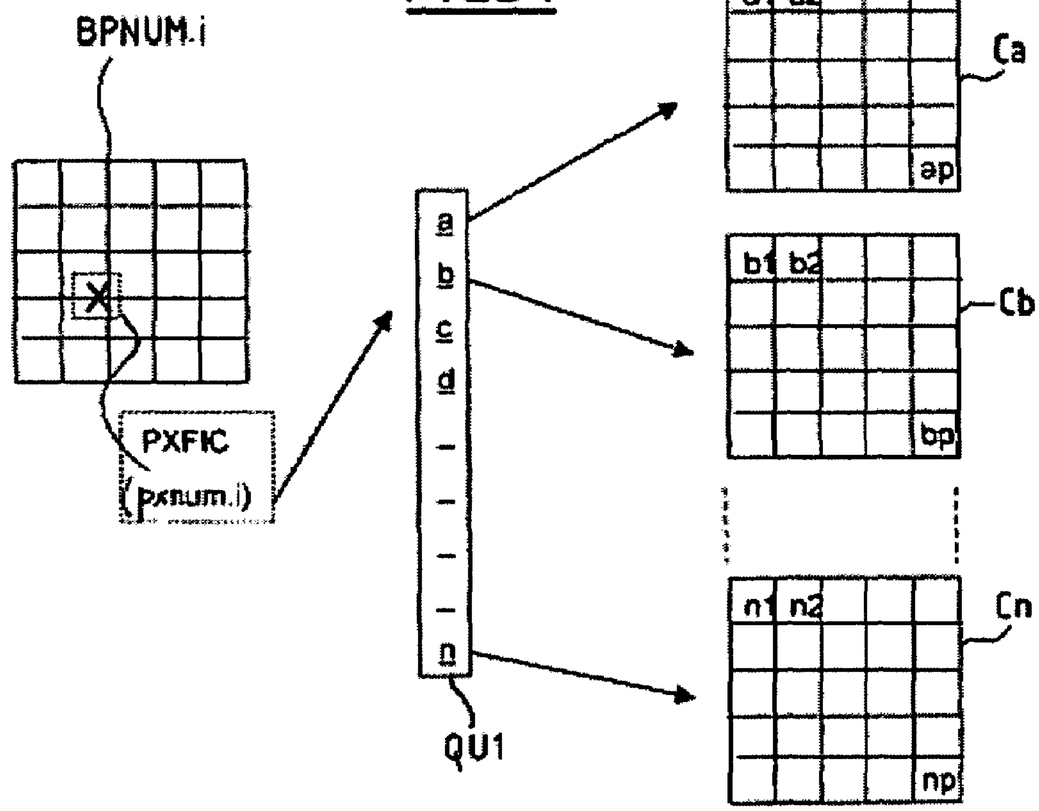

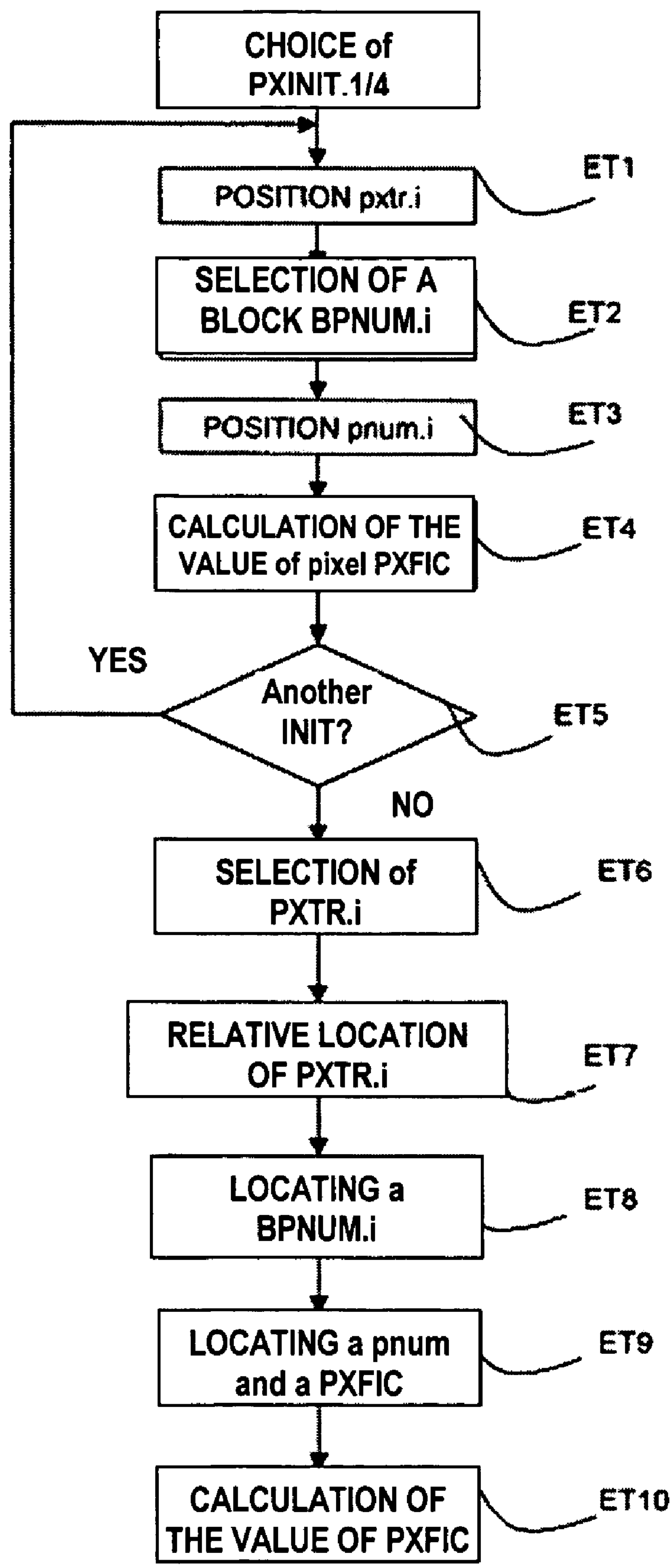
Fig_ 5a

FIG_5b
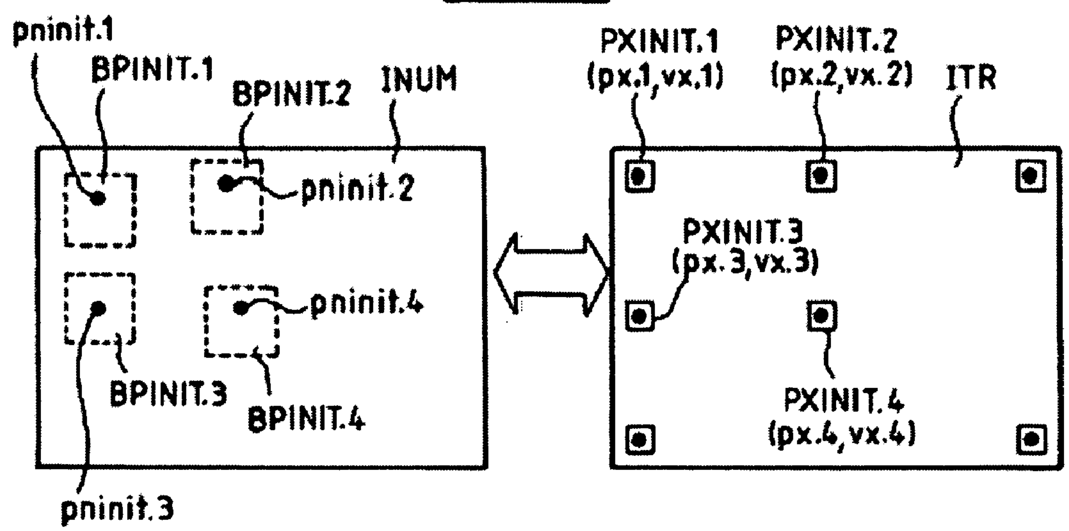
FIG_5c
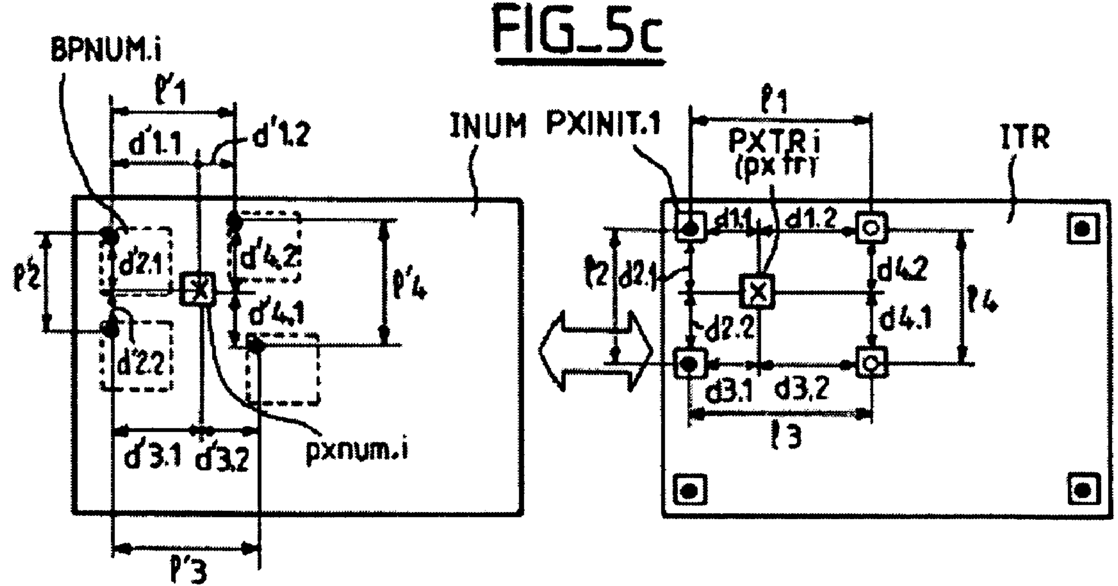

FIG_6
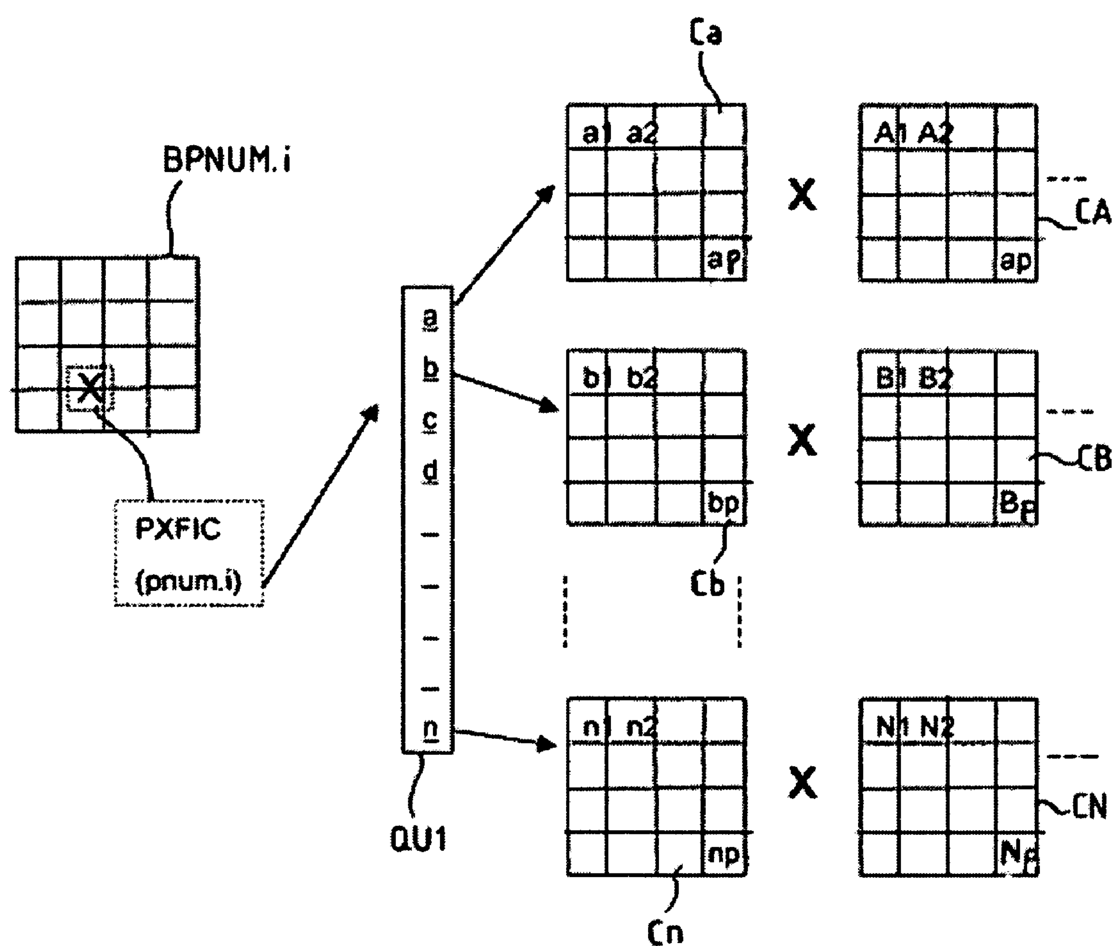

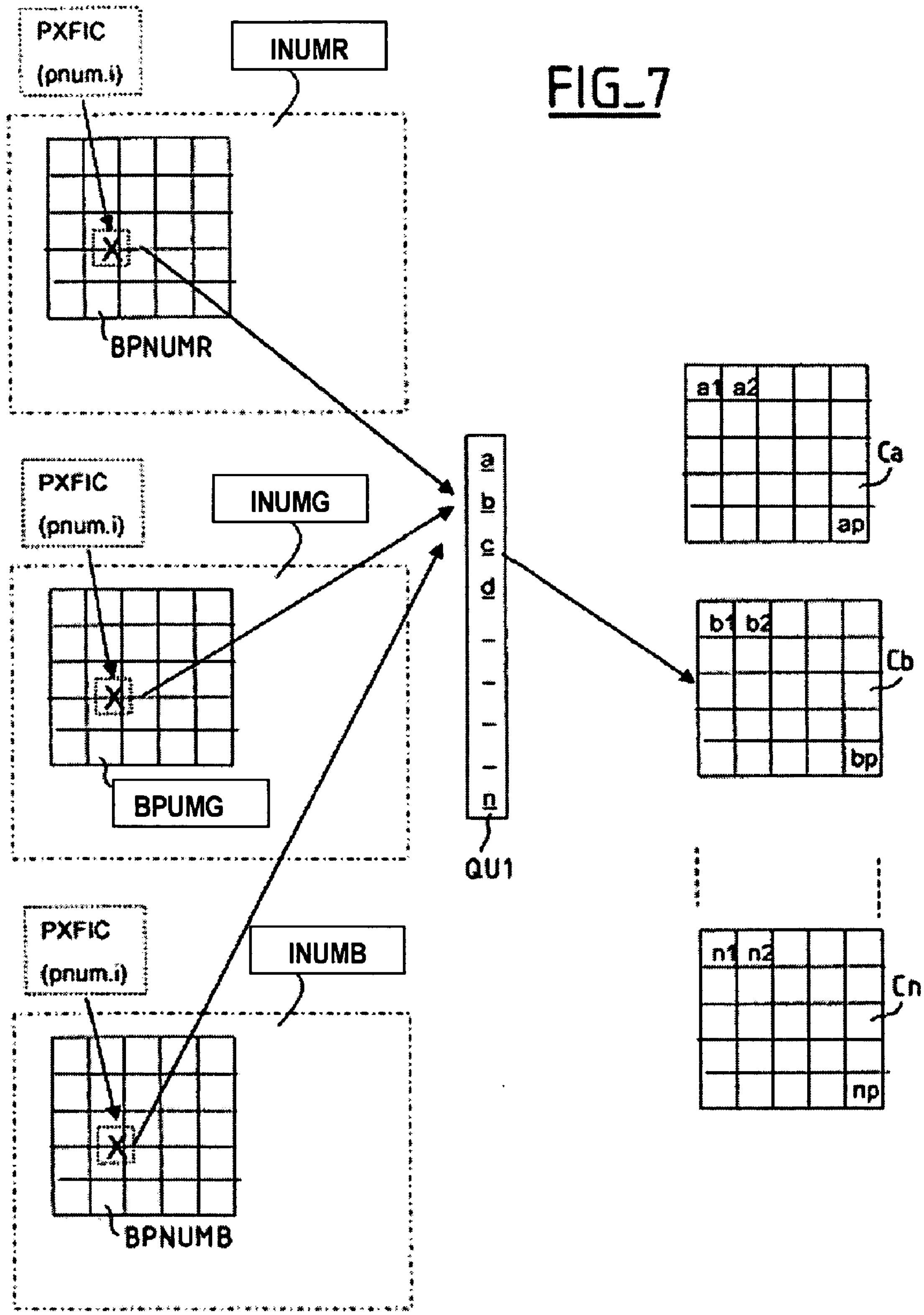
FIG_7
PXFIC
(pnum.i)
INUMR
BPNUMR
PXFIC
(pnum.i)
INUMG
BPUMG
PXFIC
(pnum.i)
INUMB
BPNUMB
a
b
c
d
n
QU1
a1
a2
ap
Ca
b1
b2
bp
Cb
n1
n2
np
Cn

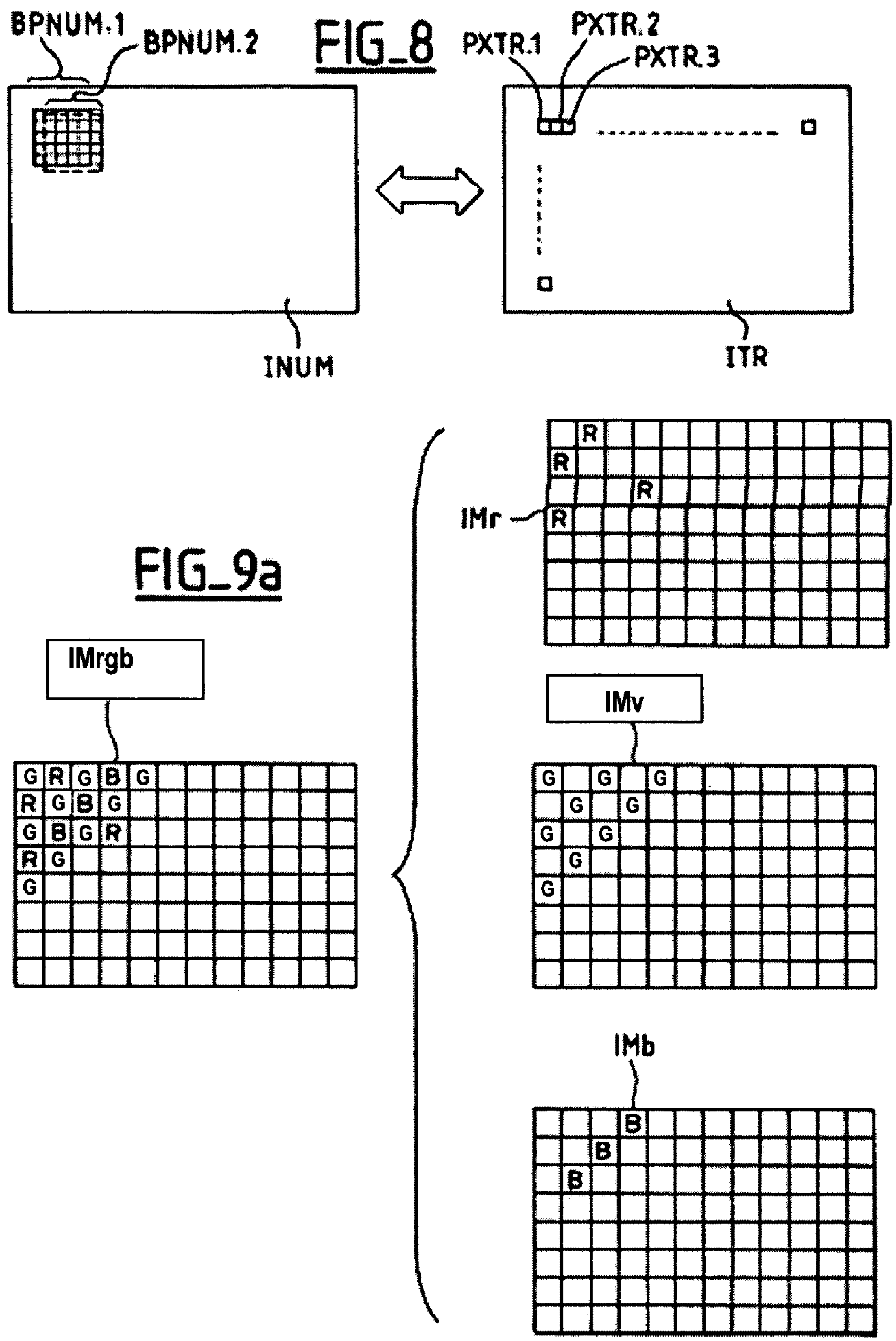
FIG_8
BPNUM.1
BPNUM.2
INUM
PXTR.1
PXTR.2
PXTR.3
ITR
FIG_9a
IMrgb
G R G B G
R G B G
G B G R
R G
G
IMr
R
R
R
R
IMv
G G G
G G
G G
G
G
IMb
B
B
B

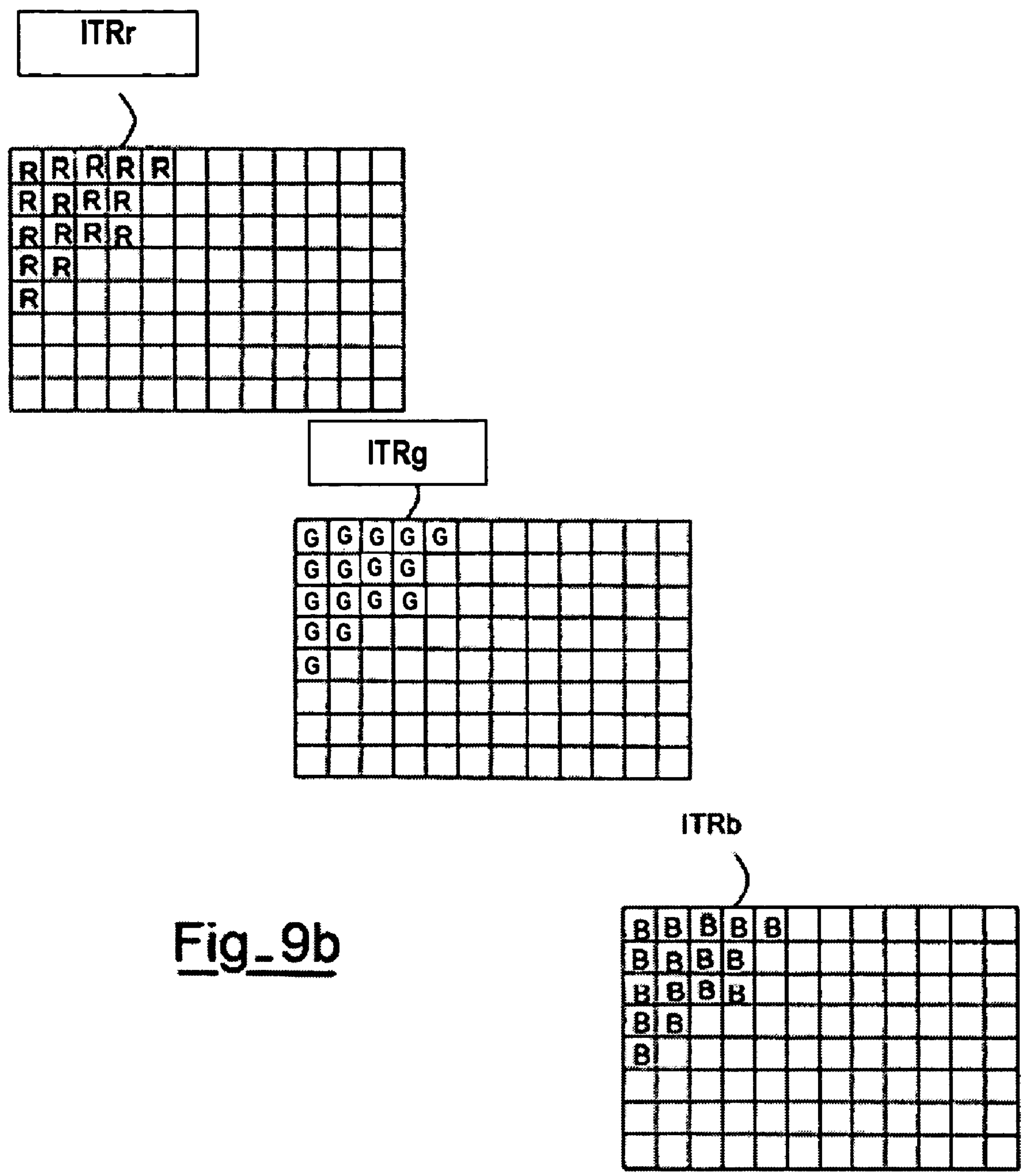
Fig_9b

FIG_10
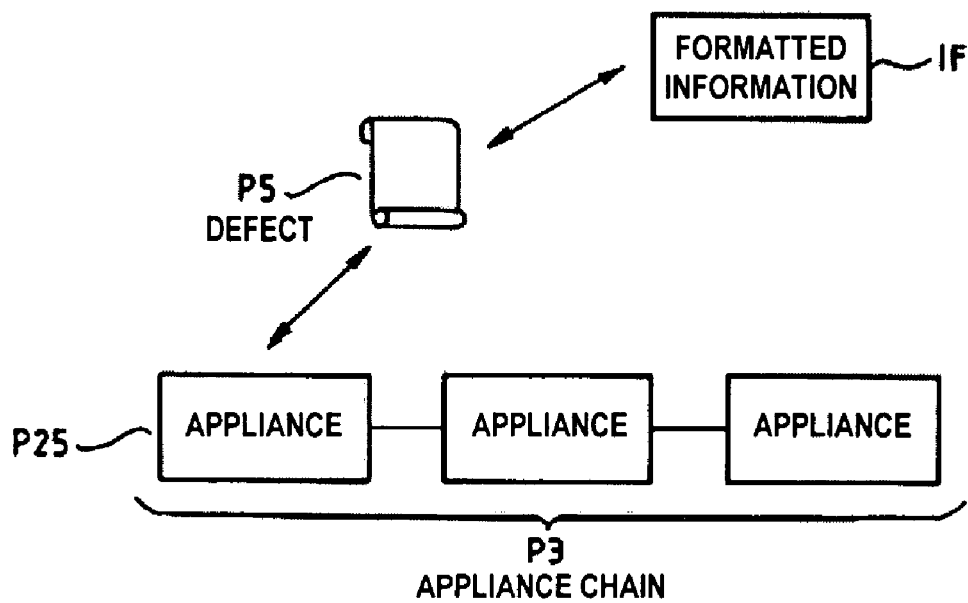
FIG_11
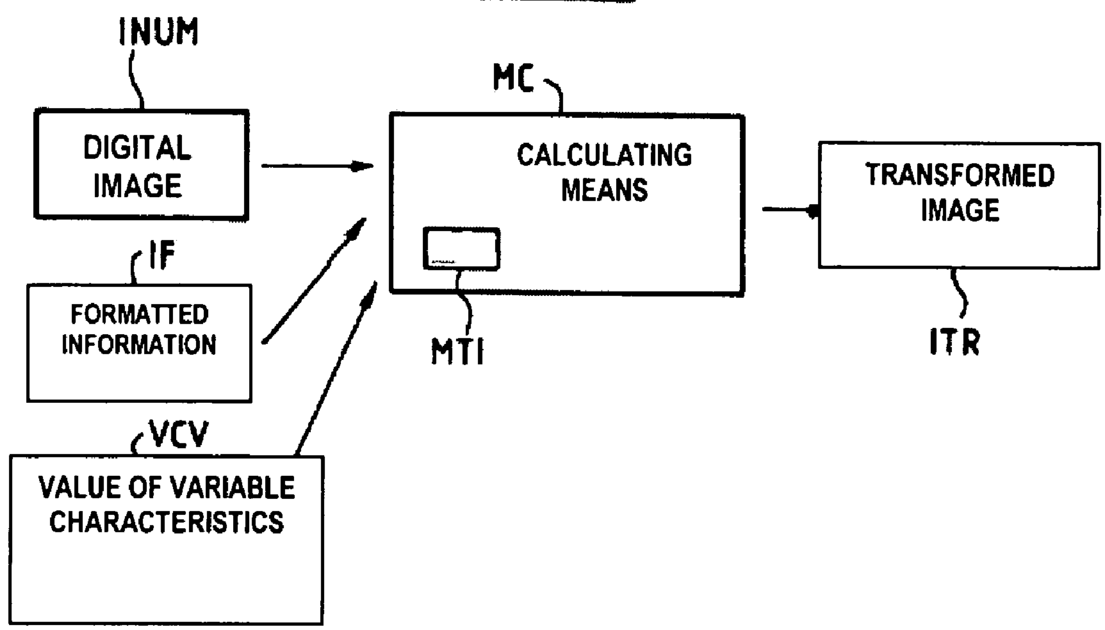

METHOD AND SYSTEM FOR CALCULATING A TRANSFORMED IMAGE FROM A DIGITAL IMAGE

BACKGROUND OF THE INVENTION

The present invention relates to a method and a system for calculating a transformed image from a digital image and formatted information related to a geometric transformation.

SUMMARY OF THE INVENTION

Method

The invention relates to a method for calculating a transformed image from a digital image and formatted information related to a geometric transformation, especially formatted information related to the distortions and/or chromatic aberrations of an appliance chain. The method includes the stage of calculating the transformed image from an approximation of the geometric transformation. It results therefrom that the calculation is economical in terms of memory resources, memory bandwidth, calculating power and therefore electricity consumption. It also results therefrom that the transformed image does not exhibit any visible or annoying defect as regards its subsequent use.

The digital image is composed of pixels preferred to hereinafter as digital pixels. The transformed image is composed of pixels referred to hereinafter as transformed pixels. The transformed pixel is characterized by a transformed position and a transformed value. Preferably, according to the invention, the method includes the stage of calculating the values of the transformed pixels by employing a general algorithm that includes the following processes:

- process (a), the process of selecting, within the digital image, from formatted information, for each transformed position, a block of digital pixels,
- process (b), the process of calculating, from formatted information, for each transformed position, a digital position within the said block of digital pixels,
- process (c), the process of calculating, for the said transformed position, the value of the transformed pixel as a function of the values of the digital pixels of the said block of digital pixels and of the said digital position.

The formatted information contains parameters. By means of the parameters it is possible to choose at least one mathematical function related to the said geometric transformation. By means of the mathematical function or functions, it is possible to calculate the block of digital pixels and the digital position from the transformed position.

Preferably, according to the invention, the general algorithm is employed by proceeding in the following manner:

- selection of the transformed pixels, referred to hereinafter as the initial transformed pixels,
- application of processes (a), (b) and (c) of the general algorithm for the initial transformed pixels, in order to obtain blocks of initial digital pixels and initial digital positions.

To each transformed pixel other than the initial transformed pixels, there is applied an optimized algorithm that includes the following processes:

- process (d), the process of selecting, from initial digital blocks and/or from each initial transformed position, a block of digital pixels within the digital image,
- process (e), the process of calculating, from initial digital blocks and/or from each initial transformed position, a digital position within the block of digital pixels,
- process (f), the process of calculating the value of the transformed pixel as a function of the values of the digital pixels of the block of digital pixels and of the digital position.

It results from the combination of technical features that it is then possible to use, for the initial digital points, formatted information that requires complex calculations, and to reduce the overall calculation time by applying a simpler algorithm to the other points, while maintaining a good approximation of the geometric transformation.

The method is employed with hardware and/or software processing means. Preferably, according to the invention, the optimized algorithm employs exclusively integral or fixed-point data. It results from the combination of technical features that it is possible to execute the general algorithm and the optimized algorithm without floating-point processor or operator, even if processes (a) and (b) perform floating-point calculations, since (a) and (b) are executed much less frequently than (c) and (d), and since it is then possible to emulate the few if any floating-point operations used. It results from the combination of technical features that it is then possible to embed the algorithms, in a photo appliance, for example, while consuming the least possible current and operating as rapidly as possible.

Preferably, according to the invention, the method additionally includes the stage of quantizing the digital positions to obtain quantized digital positions. It results from the combination of technical features that stages (c) and (f) can be employed with a limited number of inputs, thus making it possible to tabulate the coefficients and therefore to use a much smaller cache memory, and also to have a smaller bandwidth in main memory.

Preferably, according to the invention, the method additionally includes the stage of calculating blocks of coefficients. Processes (c) and (f) are performed by:

- using the quantized digital position to select a block of coefficients,
- calculating the value of the transformed pixel from the block of coefficients and from the block of digital pixels.

It results from the combination of technical features that the calculation of the blocks of coefficients can be performed before compilation.

According to an alternative embodiment of the invention, processes (c) and (f) of calculation of the value of the transformed pixel can also be applied to a transformation other than the geometric transformation, in particular to the attenuation of image blurring. It results therefrom that it is then possible to apply a plurality of image transformations while consuming less energy and less time.

The digital image may be derived from a sensor having a plurality of channels. The channels may be combined to produce color planes. Preferably in this case according to the invention, processes (c) and (f) for calculation of the value of the transformed pixel also make it possible to combine the channels in order to obtain color planes. It results from the combination of technical features that, in the case of three color planes RGB, the calculation time and the electricity consumption for employing the general algorithm and/or the optimized algorithm are divided by as much as three. It also results from the combination of technical features that the precision is better. It also results from the combination of technical features that, in the case of an appliance in which a channel-combining function is incorporated, especially a digital photo appliance, it is possible at little extra cost to add the processing of geometric transformations.

The digital image may be composed of color planes. Preferably, in this case according to the invention, the method is such that a different geometric transformation is applied to each color plane in order to correct the chromatic aberrations.

Preferably, according to the invention, the method additionally includes the stage of combining the geometric transformation with another geometric transformation, especially a zoom effect, that is variable depending on the digital image. It results from the combination of technical features that it is possible with little extra cost in time and energy to apply, to the digital image, another geometric transformation, especially a zoom effect, at the same time as the geometric transformation. It also results from the combination of technical features that it is possible to apply the geometric transformation to a digital image that has undergone another geometric transformation.

The formatted information may depend on variable characteristics that depend on the digital image, especially the size of the digital image. Preferably, in this case according to the invention, the method additionally includes the stage of determining the value of the variable characteristics for the digital image. Processes (a) and (b) use the formatted information depending on the value obtained in this way for the variable characteristics. It results from the combination of technical features that employment of the method for formatted information depending on a variable characteristic reduces to employment of the method for formatted information that does not depend on any variable characteristic.

Preferably, according to the invention, the formatted information is related to distortion defects and/or to chromatic aberrations of the appliance chain. The parameters are related to a measured field.

The transformed image may exhibit a difference compared with the image obtained by application of the geometric transformation to the digital image. Preferably, in this case according to the invention, the method additionally includes the following stages:

- the stage of choosing a threshold,
- the stage of choosing the general algorithm and/or the optimized algorithm and/or the initial transformed points, in such a way that the difference is below the threshold.

It results from the combination of technical features that the calculation time for reaching a certain level of image quality is minimal.

The transformed image may exhibit a difference compared with the image obtained by application of the geometric transformation to the digital image. Preferably, in this case according to the invention, the method additionally includes the following stages:

- the stage of choosing a threshold,
- the stage of choosing the general algorithm and/or the optimized algorithm and/or the initial transformed points and/or the quantization of the quantized digital positions, in such a way that the difference is below the threshold.

It results from the combination of technical features that the calculation time for reaching a certain level of image quality is minimal.

Preferably, according to the invention, the method additionally includes the stage of sorting the transformed positions in such a way that the blocks of digital pixels selected by processes (a) and/or (d) have a specified average number of common digital pixels. It results from the combination of technical features that a cache memory of small size or having a small number of registers is sufficient to contain a large part of the pixel values necessary for successive iterations of processes (a) and/or (d). It also results from the combination of technical features that the memory bandwidth is greatly reduced. It also results from the combination of technical features that it is not necessary to keep the complete digital image in a memory. It also results from the combination of technical features that it is not necessary to keep the complete transformed image in a memory. It also results from the combination of technical features that the cost and electricity consumption are reduced.

System

The invention relates to a system for calculating a transformed image from a digital image and formatted information related to a geometric transformation, especially formatted information related to the distortions and/or chromatic aberrations of an appliance chain. The system includes calculating means for calculating the transformed image from an approximation of the geometric transformation.

The digital image is composed of pixels referred to hereinafter as digital pixels. The transformed image is composed of pixels referred to hereinafter as transformed pixels. The transformed pixel is characterized by a transformed position and a transformed value. Preferably, according to the invention, the system includes calculating means for calculating the values of the transformed pixels by employing data-processing means provided with a general algorithm that includes the following processes:

- process (a), the process of selecting, within the digital image, from formatted information, for each transformed position, a block of digital pixels,
- process (b), the process of calculating, from formatted information, for each transformed position, a digital position within the block of digital pixels,
- process (c), the process of calculating, for the said transformed position, the value of the transformed pixel as a function of the values of the digital pixels of the said block of digital pixels and of the digital position.

The formatted information contains parameters. By means of the parameters it is possible to choose at least one mathematical function related to the geometric transformation. By means of the mathematical function or functions, it is possible to calculate the block of digital pixels and the digital position from the transformed position.

Preferably, according to the prevention, the calculating means employ the general algorithm in the following manner:

- by selection of the transformed pixels, referred to hereinafter as the initial transformed pixels,
- by application of processes (a), (b) and (c) of the general algorithm for the initial transformed pixels, in order to obtain blocks of initial digital pixels and initial digital positions.

To each transformed pixel other than the initial transformed pixels, the calculating means apply an optimized algorithm that includes the following processes:

- process (d), the process of selecting, from initial digital blocks and/or from each initial transformed position, a block of digital pixels within the digital image,
- process (e), the process of calculating, from initial digital blocks and/or from each initial transformed position, a digital position within the block of digital pixels, process (f), the process of calculating the value of the transformed pixel as a function of the values of the digital pixels of the block of digital pixels and of the digital position.

The general algorithm or the optimized algorithm is executed by hardware and/or software processing means. According to an advantageous alternative embodiment, the optimized algorithm employs exclusively integral or fixed-point data.

Preferably, according to the invention, the system additionally includes data-processing means for quantizing the digital positions to obtain quantized digital positions.

Preferably, according to the invention, the system additionally includes calculating means for calculating blocks of coefficients. Processes (c) and (f) are executed by the calculating means by:

- using the quantized digital position to select a block of coefficients,
- calculating the value of the transformed pixel from the block of coefficients and from the block of digital pixels.

Processes (c) and (f) of calculation of the value of the transformed pixel are also applicable to transformations other than the geometric transformation, in particular to the attenuation of image blurring.

The digital image derived from a sensor may have a plurality of channels. The channels may be combined to produce color planes. Preferably, according to the invention, processes (c) and (f) for calculation of the value of the transformed pixel are such that they also make it possible to combine the channels in order to obtain color planes.

Preferably, according to the invention, the digital image is composed of color planes. The system is such that the data processing means are capable of applying a different geometric transformation to each color plane in order to correct the chromatic aberrations.

Preferably, according to the invention, the system is such that the data-processing means make it possible to combine the geometric transformation with another geometric transformation, especially a zoom effect, that is variable depending on the digital image.

The formatted information may depend on variable characteristics that depend on the digital image, especially the size of the digital image. Preferably, in this case according to the invention, the system additionally includes data-processing means for determining the value of the variable characteristics for the digital image in question. The calculating means executing processes (a) and (b) use the formatted information depending on the value obtained in this way for the variable characteristics.

Preferably, according to the invention, the formatted information is related to distortion defects and/or to chromatic aberrations of the appliance chain. The parameters are related to a measured field.

The transformed image may exhibit a difference compared with the image obtained by application of the geometric transformation to the digital image. Preferably, in this case according to the invention, the system additionally includes data-processing means with which it is possible to employ a general algorithm and/or an optimized algorithm and/or initial transformed points in such a way that the difference is below a chosen threshold.

The transformed image may exhibit a difference compared with the image obtained by application of the geometric transformation to the digital image. Preferably, in this case according to the invention, the system additionally includes data-processing means with which it is possible to employ a general algorithm and/or an optimized algorithm and/or initial transformed points and/or the quantization of quantized digital positions, in such a way that the difference is below a chosen threshold.

Preferably, according to the invention, the system additionally includes data-processing means for sorting the transformed positions in such a way that the blocks of digital pixels selected by processes (a) and/or (d) have a specified average number of common digital pixels.

BRIEF DESCRIPTION OF THE SEVERAL VIEWS OF THE DRAWINGS

Other characteristics and advantages of the invention will become apparent upon reading of the description of alternative embodiments of the invention, provided by way of indicative and non-limitative examples, and of:

FIG. 1, an illustration of a simplified practical example of the invention;

FIGS. 2*a* to 2*d*, an improved practical example of a method for calculating a transformed image according to the invention;

FIG. 3, an organizational diagram of how the method of FIG. 2*a* functions;

FIG. 4, an illustration of a stage of calculation of the value of a transformed pixel;

FIG. 5*a*, an organizational diagram of an alternative embodiment of a method for calculating a transformed image according to the invention;

FIGS. 5*b* and 5*c*, explanatory illustrations of the method of FIG. 5*a;*

FIG. 6, an illustration of the stage of calculation of the value of a transformed pixel, permitting the employment of a plurality of types of corrections;

FIG. 7, an illustration of the invention applied to a color image;

FIG. 8, an improvement of the invention permitting calculation of neighboring pixels, FIGS. 9*a* and 9*b*, application of the invention to color images of GRGB type, FIG. 10, formatted information IF related to the geometric distortion defects of an appliance P25 of an appliance chain P3, FIG. 11, an example of the system according to the invention.

DETAILED DESCRIPTION OF THE INVENTION

Appliance

Referring in particular to FIG. 10, a description will be given of the concept of appliance P25. Within the meaning of the invention, an appliance P25 may be in particular:

- an image-capture appliance or an image-capture appliance, such as a disposable photo appliance, a digital photo appliance, a reflex appliance, a scanner, a fax machine, an endoscope, a camcorder, a surveillance camera, a camera integrated into or connected to a telephone, to a personal digital assistant or to a computer, a thermal camera or an echographic appliance,
- an image-restitution appliance, such as a screen, a projector, a television set, virtual-reality goggles or a printer, a human being having vision defects, such as astigmatism, an appliance which it is hoped can be emulated, to produce images having, for example, an appearance similar to those produced by an appliance of the Leica brand, an image-processing device, such as zoom software, which has the edge effect of adding blurring, a virtual appliance equivalent to a plurality of appliances P25, A more complex appliance P25, such as a scanner/fax/printer, a photo-printing Minilab, or a videoconfe-encing appliance can be regarded as an appliance P25 or as a plurality of appliances P25.

Appliance Chain

Referring in particular to FIG. 10, a description will now be given of the concept of appliance chain P3. An appliance chain P3 is defined as a set of appliances P25. The concept of appliance chain P3 may also include a concept of order.

The following examples constitute appliance chains P3:

a single appliance P25, an image-capture appliance and an image-restitution appliance, a photo appliance, a scanner or a printer, for example in a photo-printing Minilab, a digital photo appliance or a printer, for example in a photo-printing Minilab, a scanner, a screen or a printer, for example in a computer, a screen or projector, and the eye of a human being, one appliance and another appliance which it is hoped can be emulated, a photo appliance and a scanner, an image-capture appliance and image-processing software, image-processing software and an image-restitution appliance, a combination of the preceding examples, another set of appliances P25.

Defect

Referring in particular to FIG. 10, a description will now be given of the concept of defect P5. A defect P25 of appliance P25 is defined as a defect related to the characteristics of the optical system and/or of the sensor and/or of the electronic unit and/or of the software incorporated in an appliance P25; examples of defects P5 include geometric distortion, blurring, vignetting, chromatic aberrations, color rendering, flash uniformity, sensor noise, grain, astigmatism and spherical aberration.

Digital Image

Referring in particular to FIG. 1, a description will now be given of the concept of digital image INUM. A digital image INUM is defined as an image captured or modified or restituted by an appliance P25. Digital image INUM may be derived from an appliance P25 of appliance chain P3. Digital image INUM may be addressed to an appliance P25 of appliance chain P3. In the case of animated images, such as video images composed of a time sequence of fixed images, digital image INUM is defined as a fixed image of the image sequence.

Formatted Information

Referring in particular to FIG. 10, a description will now be given of the concept of formatted information IF. Formatted information is defined as data related to a geometric transformation, an example being data that are related to the defects P5 of one or more appliances P25 of appliance chain P3 and with which a transformed image ITR can be calculated by taking into account the defects P5 of appliance P25. Defects P5 can be in particular geometric distortion and/or chromatic aberration defects. The formatted information IF can be produced by using various methods based on measurements, and/or on capture or restitution of references, and or on simulations.

To produce the formatted information IF, it is possible, for example, to use the method described in the International Patent Application filed on the same day as the present application in the name of Vision IQ and entitled "Method and system for producing formatted information related to geometric distortions". That application describes a method for producing formatted information IF related to the appliances P25 of an appliance chain P3. Appliance chain P3 is composed in particular of at least one image-capture appliance and/or at least one image-restitution appliance. The method includes the stage of producing formatted information IF related to the geometric distortions of at least one appliance of the chain.

Appliance P25 makes it possible to capture or restitute an image on a medium. Appliance P25 contains at least one fixed characteristic and/or one variable characteristic depending on the image. The fixed characteristic and/or variable characteristic can be associated with one or more values of characteristics, especially the focal length and/or the focusing and their values of associated characteristics. The method includes the stage of producing, from a measured field, measured formatted information related to the geometric distortions of the appliance. The formatted information IF may include the measured formatted information.

To produce the formatted information IF, it is possible, for example, to use the method described in the International Patent Application filed on the same day as the present application in the name of Vision IQ and entitled "Method and system for reducing update frequency of image processing means". That application describes a method for reducing the update frequency of image-processing means, in particular software and/or a component. The image-processing means make it possible to modify the quality of the digital images derived from or addressed to an appliance chain. The appliance chain is composed of at least one image-capture appliance and/or at least one image-restitution appliance. Image-processing means employ formatted information related to the defects of at least one appliance P25 of appliance chain P3. The formatted information IF depends on at least one variable. The formatted information makes it possible to establish a correspondence between one part of the variables and of the identifiers. By means of the identifiers it is possible to determine the value of the variable corresponding to the identifier by taking the identifier and the image into account. It results from the combination of technical features that it is possible to determine the value of a variable, especially in the case in which the physical significance and/or the content of the variable are known only after distribution of image-processing means. It also results from the combination of technical features that the time between two updates of the correction software can be spaced apart. It also results from the combination of technical features that the various economic players that produce appliances and/or image-processing means can update their products independently of other economic players, even if the latter radically change the characteristics of their product or are unable to force even client to update their products. It also results from the combination of technical features that a new functionality can be deployed progressively by starting with a limited number of economic players and pioneer users.

To produce the formatted information IF, it is possible, for example, to use the method described in the International Patent Application filed on the same day as the present application in the name of Vision IQ and entitled "Method and system for providing formatted information in a standard format to image-processing means". That application describes a method for providing formatted information IF in a standard format to image-processing means, especially software and/or components. The formatted information IF is related to the defects of an appliance chain P3. The appliance chain P3 includes in particular at least one image-capture appliance and/or one image-restitution appliance. The image-processing means use the formatted information IF to modify the quality of at least one image derived from or addressed to the appliance chain P3. The formatted information IF includes data characterizing the defects P5 of the image-capture appliance, especially the distortion characteristics, and/or data characterizing the defects of the image-restitution appliance, especially the distortion characteristics.

The method includes the stage of filling in at least one field of the said standard format with the formatted information IF. The field is designated by a field name. The field contains at least one field value.

To search for the formatted information IF, it is possible, for example, to use the method described in the International Patent Application filed on the same day as the present application in the name of Vision IQ and entitled "Method and system for modifying the quality of at least one image derived from or addressed to an appliance chain". That application describes a method for modifying the quality of at least one image derived from or addressed to a specified appliance chain. The specified appliance chain is composed of at least one image-capture appliance and/or at least one image-restitution appliance. The image-capture appliances and/or the image-restitution appliances being progressively introduced on the market by separate economic players belong to an indeterminate set of appliances. The appliances P25 of the set of appliances exhibit defects P5 that can be characterized by formatted information. For the image in question, the method includes the following stages:

- the stage of compiling directories of the sources of formatted information related to the appliances of the set of appliances,
- the stage of automatically searching for specific formatted information related to the specified appliance chain among the formatted information compiled in this way,
- the stage of automatically modifying the digital image INUM by means of image-processing software and/or image-processing components, while taking into account the specific formatted information obtained in this way.

Variable Characteristic

A description will now be given of the concept of variable characteristic. According to the invention, a variable characteristic is defined as a measurable factor, which is variable from one digital image INUM to another that has been captured, modified or restituted by the same appliance P25, and which has an influence on defect P5 of the image that has been captured, modified or restituted by appliance P25, especially:

- a global variable, which is fixed for a given digital image INUM, an example being a characteristic of appliance P25 at the moment of capture or restitution of the image, related to an adjustment of the user or related to an automatic function of appliance P25,
- a local variable, which is variable within a given digital image INUM, an example being coordinates x, y or rho, theta in the image, making it possible to apply, if need be, local processing that differs depending on the zone of the digital image INUM.

A measurable factor which is variable from one appliance P25 to another but which is fixed from one digital image INUM to another that has been captured, modified or restituted by the same appliance P25 is not generally considered to be a variable characteristic. An example is the focal length for an appliance P25 with fixed focal length.

The formatted information IF may depend on at least one variable characteristic.

By variable characteristic there can be understood in particular:

- the focal length of the optical system,
- the redimensioning applied to the image (digital zoom factor: enlargement of part of the image; and/or under-sampling: reduction of the number of pixels of the image),
- the nonlinear brightness correction, such as the gamma correction,
- the enhancement of contour, such as the level of deblurring applied by appliance P25,
- the noise of the sensor and of the electronic unit,
- the aperture of the optical system,
- the focusing distance,
- the number of the frame on a film,
- the underexposure or overexposure,
- the sensitivity of the film or sensor,
- the type of paper used in a printer,
- the position of the center of the sensor in the image,
- the rotation of the image relative to the sensor,
- the position of a projector relative to the screen,
- the white balance used,
- the activation of a flash and/or its power,
- the exposure time,
- the sensor gain,
- the compression,
- the contrast,
- another adjustment applied by the user of appliance P25, such as a mode of operation,
- another automatic adjustment of appliance P25.

Variable Characteristic Value

A description will now be given of the concept of variable characteristic value VCV. A variable characteristic value VCV is defined as the value of the variable characteristic at the moment of capture, modification or restitution of a specified digital image INUM.

Parameterizable Model

Within the meaning of the invention, a parameterizable model is defined as a mathematical model that can depend on variable characteristics related to one or more defects P5 of one or more appliances P25. The formatted information IF related to a defect P25 of an appliance can have the form of parameters of a parameterizable model that depends on variable characteristics.

Calculation of the Transformed Image

Referring to FIG. 1, a description will be given of a general practical example of the method and system of the invention.

A digital image INUM contains a set of image elements defined as pixels PXnum.1 to PXnum.n distributed regularly over the surface of image INUM. In FIG. 1, these pixels have the shape of squares, but they could also have any other shape, such as circles; that depends on the style of the surfaces designed to carry the image in the appliances for image capture and restitution. In addition, in FIG. 1 the pixels are illustrated as being joined, but in reality some spacing is generally present between the pixels.

Transformed image ITR also contains a set of pixels defined as transformed pixels PXTR.1 to PXTR.n. Each transformed pixel is characterized by a transformed position pxtr and a transformed value vxtr.

A transformed image is a corrected or modified image obtained by application of a transformation to an image. This transformation, which may be a geometric transformation, is performed by incorporating, in the calculation, formatted information that takes into account, for example, defects of the appliances used or characteristics that are to be introduced into the image.

It will be noted that the formatted information may be related to a limited number of transformed pixels and/or may incorporate values VCV of variable characteristics that depend on the image (such as the focal length, the focusing, the aperture, etc.). In this case there may exist a supplementary stage which, for example, is performed by interpolation in such a way that it is reduced to simple formatted information such as that of an appliance that is not provided with any variable characteristics, so that the case of appliances with variable focal length reduces to the case of an appliance with fixed focal length.

In the example of a function x',y'=f(x, y, t), where t is a variable characteristic, the formatted information can be composed of a limited number of values (xi, yi, ti, f(xi, yi, ti)). It is then necessary to calculate an approximation for the other values of x, y, t. According to the same formalism, it could be a vector and could include a plurality of variable characteristics simultaneously. In the case of distortion, the formatted information could be composed if necessary of vectors with which the displacement that each point follows can be indicated, or of a set of discrete elements representing the measurement points used during a preliminary calibration stage, or else any functions corresponding to an approximation to this discrete set, in such a way as to reduce the volume of formatted information.

It will be possible for the formatted information to include not only data related to the appliances used and designed in a preliminary phase, but also all information styled in the Exif or other format that could provide particulars on the adjustments of the appliance at the moment of filming (focal length, focusing, aperture, speed, flash, etc.).

Digital image INUM represents, for example, the capture of an image of a rectangle. In FIG. 1, the pixels corresponding to the trace of the rectangle are shown in solid black. Because of distortions of the capture appliances, the rectangle has been deformed, as in the image INUM illustrated in FIG. 1. The invention makes it possible, by means of a calculation CAPP that incorporates approximations according to a desired final precision, among other factors, to obtain the values vxtr of transformed pixels having position pxtr and to obtain, on transformed image ITR, a rectangle in which the position and value of the pixels are effectively corrected to within the approximations.

We note that the application of algorithm CAPP may, in the case of a distortion, reduce the deformed image to a perfect or quasi-perfect image. The same algorithm may also reduce the deformed image to another image, which if necessary is differently deformed, in such a way as to produce an image closely resembling a known type of image (fish-eye effect, retro distortion, etc.). The same algorithm also makes it possible to reduce the deformed image to an image that is not perfect (in the sense of a straight line as in FIG. 1) but is optimal to the eyes of the observer, such that it is possible to compensate if necessary for geometric defects of perception of the human eye.

FIG. 2a illustrates an example of the improved method and system according to the invention. Only the pixels useful for the description of this method and system are illustrated on the digital image and on the transformed image. On the transformed image there is illustrated a pixel PXTR.i, whose value is to be determined. To the position of a transformed pixel pxtr.i in the transformed image there corresponds, in the digital image, a position pxnum.i, which is obtained from formatted information (IF) that includes, in the case of distortion, for example, the displacement vector that must be added to pxnum.i in order to drop back down to pxtr.i.

The invention includes different stages as described and illustrated in FIG. 3.

Firstly, the position pxtr.i of a transformed pixel PXTR.i in the transformed image is identified (Stage ET1). In the course of a subsequent stage (ET2), given knowledge of the position in image ITR, there is deduced therefrom, by means of formatted information IF conveying the characteristics of appliances for image capture and/or restitution, the position of a pixel block BPNUM.i of digital image INUM, which block surrounds position pxnum.i of a point corresponding to transformed pixel PXTR.i. According to the example of FIG. 2a, a pixel block contains 5×5 pixels.

Then (stage ET3), digital position pxnum.i of the point of the digital-pixel block corresponding to pixel PXTR.i is calculated, by means of the formatted information, for transformed position pxtr.i of pixel PXTR.i. As is obvious in FIG. 2a, this point does not necessarily correspond to the position of the center of a pixel of pixel block BPNUM.i. It can therefore be understood that the transformed value of pixel PXTR.1 does not correspond to the value of a digital pixel.

In the course of the next stage (ET4), given knowledge of the position of a point pxnum.i in block BPNUM.i, there is calculated the value of an imaginary pixel situated in block BPNUM.i and having point pxnum.i as center. This imaginary pixel PXFIC has a value that must take into account the value of the pixels surrounding point pxnum.i in the block and therefore must also take into account the position of this point in the block. According to a simple method, an average can be taken of the values of the pixels surrounding the point.

It is also possible to take an average of the pixel values of the block by assigning, to the value of each pixel, a coefficient which is a function of the distance of that pixel relative to position pxnum.i of the point. This is equivalent to taking the following sum for the entire pixel block.

$$\Sigma vxnum.j \times Cj(\text{digital position pxnum.i})$$

where vxnum.j=value of a pixel in the block,

Cj=coefficient of the pixel as a function of position pxnum.i of the point.

The coefficient of each pixel of a block, as a function of position pxnum.i of the point, can be calculated in different ways. A first way is to use an analytical expression for calculation of the coefficients of each pixel of the block, as a function, for example, of the order of the approximation surface, of the precision of the calculator and of the position pxnum.i in the block.

A simpler way is to limit the number of possible positions of a point in the block by a technique of quantization of position pxnum.i. In such a case, it is provided that a table of coefficients will be constructed for each possible position of a point in the block. For the different quantized values of positions in a block, there will be calculated a plurality of series of coefficients with, in each series, a coefficient value per pixel of the block.

Subsequently, during stage ET4 described in the foregoing, there will be quantized that position pxnum.i of the point in the block which will make it possible to access a series of coefficients with one useful coefficient per pixel of the block. It will be sufficient to multiply this series of coefficients by the series of values of the same pixels.

FIG. 4 shows a schematic diagram of such a process. The position pxnum.i of a point is quantized as a described value that can take a limited number of values from a to n.

For each described value of the position of a point, there is available a table Ca to Cn of coefficients. For a value "a", for example, table QU1 permits access to a table of coefficients a1 to an. By means of the value "a", for example, it is possible to access table Ca. Table Ca contains as many coefficients a1 to an as pixel block BPNUM.i contains pixels. Each of these coefficients was calculated as a function of the position pxnum.i of the point in the block in such a way as to assign a weight to the value of each pixel. It will be easily understood that the pixels most distant from the point of position pxnum.i in the block will have lesser weight, whereas the closest pixels will have greater weight.

By means of table Ca of coefficients and of the set of pixel values of block BPNUM.i, there is performed the operation $$\Sigma(vxnum.j \times Cj)$$

in such a way as to obtain the value of an imaginary pixel PXFIC, and it is this value that will be assigned to transformed pixel pxtr.i of transformed image ITR.

In a practical example, it will be possible to consider that the position of a point pxnum.i obtained by means of formatted information from the position of a transformed pixel can be expressed by an integral part (or a first address number) and a decimal part (or a second address number). As an example, it will be possible for the quantization of the address pxnum.i described in the forgoing to relate uniquely to the decimal part.

It will be possible for the integral part to be the address of a pixel block BPNUM.i in image INUM, or more precisely the address of a defined pixel of this block, such as pixel PXnum.1 of the block.

The decimal part will designate the address of the point in the block. For this address it will be possible to quantify the number of options and to decide that the address may be expressed in only a limited number of bits, thus limiting the number of tables Ca to Cn of coefficients. For example, if an address in the block is expressed in 3 bits, it will be necessary to provide 8 tables Ca to Cn of coefficients.

Thus it is possible to execute the method of the invention without floating-point processor or operator, even if stages ET2 and ET3 perform floating-point calculations, since these stages will tend to be executed much less frequently than stage ET4 and since it is then possible to emulate the few if any floating-point operations used, such that it is then possible to embed the said algorithms in a photo appliance, for example, while consuming the least possible current and operating as rapidly as possible. In this case, the system according to the invention includes hardware and/or software processing means without a floating-point processor or operator.

Nevertheless, it is possible to use so-called floating-point processors or operators (example: Intel Pentium processor) as opposed to so-called fixed-point processors or operators (example: Texas Instruments signal-processing processor TMS320C54xx).

The foregoing method may be applied to all the pixels of the transformed image in order to know their value from the values of the digital pixels.

For this example of the method there was taken, by way of example, a square-shaped block of digital pixels. As illustrated in FIGS. 2*b*, 2*c* and 2*d*, however, this block could have any other shape (circular, hexagonal, etc.).

A description will now be given of an improvement of the method and system of the invention, wherein faster processing can be achieved. It is postulated that, for each transformed pixel, the calculation of the position of a point in the digital image by means of formatted information takes time that can be saved.

FIG. 5*a* illustrates an organizational diagram of an example of an alternative embodiment of a method for calculating a transformed image.

Firstly (stage ET0), there is chosen, in the transformed image, a certain number of pixels, which will be defined as initial transformed pixels. For example, four pixels PXINIT.1 to 4 are chosen.

The method described in the foregoing is applied for each transformed pixel. This is why FIG. 5*a* shows the same stages ET1 to ET4 as those of FIG. 3. Once stages ET1 to ET4 have been applied to an initial transformed pixel PXINIT.1 to 4, the system queries itself (stage ET5) to determine whether all the initial transformed pixels have been processed; if this is not the case, the process of stages ET1 to ET4 is repeated for another initial transformed pixel. Once all the initial transformed pixels have been processed, the system is ready to pass on to the next stage ET6 of the method. At the end of stage ET5, the situation is as illustrated in FIG. 5*b*, with:

- in transformed image ITR, four transformed pixels PXINIT.1 to 4;
- in digital image INUM, four blocks BPINIT.1 to 4 of initial digital pixels, containing points pninit.1 to 4. The positions of blocks BPINIT.1 to 4 in image INUM are known (see stage ET2 of the method). The positions of points pninit.1 to 4 in their respective blocks are also known (see stage ET3 of the method).

It is now necessary to calculate the value of an arbitrary transformed pixel PXTR.i of the transformed image. In FIG. 5*c*, this pixel PXTR.i is situated between the initial transformed pixels, but that is not necessary.

In the course of stage ET6, therefore, a pixel PXTR.i is selected and its position pxtr in the transformed image is acquired.

In the course of stage ET7, the relative position of pixel PXTR.i relative to initial transformed pixels PXINIT.1 to 4 is calculated. For example, given knowledge of the positions (px.1, px.2, etc.) of all these pixels, there are calculated the distances 11 to 14 between initial transformed pixels, as well as the distances d1.1, d1.2, d2.1, . . . d4.2 of pixel PXTR.i to initial transformed pixels PXINIT.1 to 4. The position of pixel PXTR.i is then expressed as a relative position relative to the initial transformed pixels and/or relative to the distances separating the initial transformed pixels. Thus it will be possible to express this relative position in percentages of distances. It will also be possible to express this position in the form of a bilinear relation of the type:

$$(d1.1)(d2.1)(px.4)+(1-d1.1)(d2.1)(px.3)+(d1.1)(1-d2.1)(px.2)+(1-d1.1)(1-d2.1)(px.1)$$

or any other relation of higher order.

In the course of stage ET8, digital-pixel block BPNUM.i containing the point resulting from the mathematical projection of transformed pixel PXTR.i onto the digital image is located on the basis of previously calculated proportionality relations.

In the course of stage ET9, using the same proportionality rules, there is determined position pxnum.i, in block PBNUM.i, of the point resulting from the mathematical projection of transformed pixel PXTR.i onto the digital image.

At this stage, the use of proportionality rules applied to the set of points of the image is more economical in terms of calculation time than the use of formatted information.

As in the foregoing, it will be possible to quantize the position of point pxnum.i and to express it on a limited number of bits. It will be possible to take the same quantization base as that adopted drawing calculation of the values of the initial transformed pixels, thus permitting use of the same tables of coefficients to be applied to the digital-pixel block to obtain the value of pixel PXFIC and therefore that of transformed pixel PXTR.i (stage ET10).

It will be noted that:

- the initial transformed pixels can be disposed in a regular matrix, and that the matrix spacing can be a power of two, in order to be able to benefit from parallel instructions of a processor, especially the MMX, SSE or SSE2 instructions of Intel or the 3DNow instructions of AMD,
- using bilinear interpolation it is possible to locate a pixel block (stage ETB) and to locate a Point in this located pixel block (stage ET9).

According to an alternative embodiment of the invention, it can be provided that the method of calculation of the pixel value will be performed in a plurality of stages, in order to reduce block size and the final number of additions and/or multiplications executed by the calculator. For certain values of the coefficients Cj representing what the person skilled in the art refers to as a mathematically separable interpolation operator, it is possible to apply the general and/or optimized algorithm to the intermediate result, first for a horizontal geometric transformation and again for a vertical geometric transformation, thus theoretically dividing by two the number of multiplications and/or additions necessary to process a block.

It will also be noted that:

- quantization of the positions of the transformed pixels and of the digital pixels makes it possible to construct tables of coefficients of constant and limited dimension, making it possible to use a much smaller cache memory and to have a smaller bandwidth in main memory. This is possible because the calculations of stages ET3 and ET10 depend only on the digital position in the pixel block.
- the tables of coefficients can be constructed once and only once in the system. Of course, it is possible to have a plurality of types of tables of coefficients of different sizes, corresponding to digital-pixel blocks of different sizes. For example, by modifying the quantization precision, it will be possible to modify the degree of approximation of the processing operation and therefore to modify the quality of the transformed image obtained. It is also possible to have a plurality of tables of coefficients that have the same size but in which, for the same position of a point in a digital-pixel block, the different types of tables contain coefficients of different values in order to compensate, as the case may be, for the choice of different types of distinct defects (distortion, vignetting, blurring, etc.).

An advantageous dimension for the tables of coefficients may be 4×4, but that is not necessary.

The coefficients may be those of a bicubic interpolation, and the calculations of stages ET3 and ET10 may be performed in the form of a scalar product.

The approximation of the processing operation resulting from quantization of the pixel positions on a limited number of bits, as has just been described, yields a transformed image that can exhibit a difference compared with an image obtained entirely by mathematical transformation. Under these conditions, it may be decided to limit this approximation by providing, in the method, a stage of choosing a threshold. This stage will relate in particular to the choice of a quantization threshold, by deciding that the quantization will not go below a specified threshold, in such a way as to obtain, in a pixel block, a number of digital positions of a point that is not below this threshold. Thus it will be possible to optimize the calculation time for a specified quality of transformed image.

FIG. 8 illustrates an improvement of the invention with which memory cycle time and therefore processing time can be saved. It is easily understood that the calculation of the value of two neighboring transformed pixels leads to the use of two digital-pixel blocks having common pixels, meaning that the values of these common pixels will be read two times (according to this example). The object of the improvement of the invention is to avoid this double reading. Thus it is provided that the positions of the transformed pixels will be sorted in such a way that they will be processed in a certain order. For example, it may be decided to process the transformed pixels of the transformed image line-by-line and, in each line, pixel-by-pixel, by tracing each line from left to right. In FIG. 8, for example, pixel PXTR.1 may be processed first, then pixel PXTR.2 and so on.

The processing of pixel PXTR.1 according to the method described in the foregoing leads to:

- selection of a digital-pixel block BPNUM1,
- positioning of a point in this pixel block,
- calculation of the value of transformed pixel PXTR.1 as a function of the position of this point and of the pixel values of the block.

According to the improvement of the method and system of the invention, the values of the BPNUM.1 pixels are kept in a temporary memory. For practical purposes, it will be possible to store the values of these pixels in cache memory, for example.

- Processing of pixel PXTR.2 leads, for example, to selection of digital-pixel block BPNUM.2, which possesses pixels common to block BPNUM.1 used in the foregoing. Since the values of these pixels were kept in temporary memory, the system needs to search only for the values of the pixels of BPNUM.2 that are not common to block BPNUM.1; in FIG. 8, these are the pixels of the right column of block BPNUM.2. After pixel PXTR.2 has been processed, the pixel values of block BPNUM.2 are kept in temporary memory in order to prepare for processing of the next transformed pixel, PXTR.3.

According to an alternative version of the invention, it is permissible to keep in temporary memory only the values of the pixels common to two successively used pixel blocks. In general, only the values of an average number of pixels common to two successively used pixel blocks will be stored in temporary memory.

The foregoing description was provided in the scope of distortion correction, but the invention is also applicable to correction or attenuation of blurring in such a way that a plurality of image transformations can be performed while consuming less energy and less time.

This same description is also applicable to the case of an appliance chain in which one or more appliances might exhibit defects such as distortion. A combination of formatted information would be conveyed in the space of the distortion by a simple vector summation, thus making it possible to process the entirety of the defect over the appliance chain in a single pass.

It is also possible to combine, in the same transformation, a plurality of types of corrections such as filling of discrete RGB and/or CMYK values on a color-image sensor, suppression of vignetting of the image, addition of an enlargement or zoom effect, or change of perspective.

FIG. 6 schematically shows the calculation stages (ET4 or ET10) in which there can be provided, for calculation of the value of each transformed pixel, supplementary tables of coefficients with which other corrections can be made. For example, in FIG. 6, the corrected pixel values can be calculated from tables Ca to Cn of coefficients after the distortions have been corrected. By means of tables CA and CN of coefficients, it is possible to correct other defects such as image blurring, vignetting, etc. The multiplication of the tables by one another, as indicated in FIG. 6, or any other operation by which the coefficients of a table can be combined, makes it possible to combine a plurality of corrections of different types and thus to economize on processing time and energy consumption. Such an arrangement makes it possible to apply one correction or another optionally, or to apply all of the corrections if so desired by the user.

A description will now be given of the application, to processing of a color image, of practical examples of the methods and system described in the foregoing.

It may be considered that a color image is derived from a plurality of channels and provides a plurality of image planes or color planes.

As illustrated in FIG. 7, a color image is considered to be composed of a red image INUMR, a green image INUMG, and a blue image INUMB.

The methods described in the foregoing are executed as far as the stage of calculation of the value of a transformed pixel, or in other words as far as stage ET3 of FIG. 3 or ET9 of FIG. 5*a*. Thereby there is known the position of a digital-pixel block (BPNUMR, BPNUMG, BPNUMB) in each image INUMR, INUMG and INUMB, as well as the position, in these blocks, of a point corresponding to the transformed pixel whose value is to be calculated. There is also known the value of the different pixels of which the blocks BPNUMR, BPNUMG and BPNUMB are composed.

By means of the position of the point corresponding to the transformed pixel to be calculated, it is possible to access a table of coefficients, such as table C1 in FIG. 7. As in the foregoing, the calculation $$\Sigma(\text{vxnum.i}\times\text{Cj})$$

is performed by taking the sum of the products of a pixel value of the block times the corresponding coefficient from the table of coefficients. This operation is performed for block BPNUMR of the red image, then for block BPNUMG of the green image and finally for block BNUMB of the blue image. In this way there is obtained the value of a transformed pixel in its red, green and blue components.

By means of such a method and system, time and energy consumption for the color can be saved. Such a processing operation can therefore be incorporated in a digital photo appliance. Addition of geometric transformations to the processing operation may then be envisioned.

The invention is applicable to the processing of color images in which the numbers of pixels of the different colors or numbers of color channels (r, g, b) are not equal. For example, a trichromatic image IMrgb, such as illustrated in FIG. 9*a*, may contain two green pixels per red pixel and per blue pixel, as is generally the case of color sensors where the eye is very sensitive to the green wavelengths. Furthermore, from the viewpoint of software processing of the image, a color image is considered as containing as many images (or color planes) as there are basic colors in the image. For example, image IMrgb of FIG. 9*a* is considered as containing the three color planes IMr, IMg, IMb. In the method and system described in the foregoing, each color plane will be processed independently, so as to obtain three transformed images. In addition, it may be advantageous to assign a value to each pixel of each of these transformed images. FIG. 9*b* illustrates three transformed image planes ITRr, ITRg and ITRb corresponding to the three color image planes IMr, IMg and IMb of FIG. 9*a*. The value of each pixel of the different transformed image planes is calculated by applying the method described in the foregoing and by taking, for each transformed color pixel (red, for example), a digital-pixel block of the corresponding digital color image (the plane IMr in the adopted example).

In addition, during application of the method and system to a color image, it will be possible to combine the processing of the three color planes in order to economize on time and electrical energy.

In particular, it will be possible to provide for application of the same geometric transformation between a transformed color image plane and a digital color image plane to compensate for distortion, for example.

It will also be possible to apply different geometric transformations for the different color planes, so as to correct the chromatic aberrations and/or the distortion.

It will be noted that, in an RGB image (with three channels), the transformed color planes can be obtained by taking one pixel out of three.

In the foregoing description, the transformed image and the digital image correspond to one another by geometric transformation. It is possible to combine a first specified geometric transformation resulting in particular from fixed and known characteristics of the appliances used with a second geometric transformation, such as a variable geometric transformation that is a function of the digital image and in particular, for example, of the image-capture conditions (zoom effect, for example), thus making it possible, with a small extra cost in time and energy, to apply the other geometric transformation, the zoom effect in the adopted example, simultaneously with the first geometric transformation to the digital image, and also making it possible to apply the variable geometric transformation to a digital image that has undergone the first geometric transformation.

The second geometric transformation may be, in particular:

a rotation a rotation by 90 degrees or 180 degrees, a translation, a zoom effect, a redimensioning effect, a change of perspective, a change of reference frame, a projection, a geometric transformation represented by a function with which coordinates x' and y' can be calculated from coordinates x and y, the identity, a combination of these examples, any linear or nonlinear geometric transformation.

The combination of the two geometric transformations may be undertaken for various purposes:

to apply the second geometric transformation, especially a zoom effect, simultaneously with the first geometric transformation to the digital image, in order to be able, in the case in which the geometric transformation is related to a distortion, for example, to obtain a transformed image of the same size as the digital image, despite the redimensioning effect necessary to obtain straight image edges;

to combine the distortions of a plurality of appliances of a chain in order to correct them in one stage;

in the case, for example, in which a digital photo appliance produces images of various sizes by applying a zoom effect, and in which the geometric transformation is related to the geometric distortions of the appliance, the combination of the geometric transformation with the zoom effect makes it possible to correct the distortions; information relating to the history of the processing operations applied to the digital image may be useful for this purpose.

The combination of the two geometric transformations may be performed in various ways:

by calculation applied to the parameters, by calculation applied to the mathematical functions, for example by addition of vectors in the case of a vector field, or by combination of polynomials in the case of polynomials; the mathematical functions may be functions that calculate coordinates x' and y' from coordinates x and y, by calculation at each iteration of the processes of stages ET2 and ET3; in this case, the extra calculation time for application of the second geometric transformation to the initial transformed points can be made very small by employing the optimized algorithm to apply the method of FIG. 5*a*.

The invention is applicable not only in any image-processing system but also in photographic appliances, video cameras, surveillance cameras, computer cameras of the webcam type, etc.

It will be possible to employ the practical examples of the invention described in this way in the form of software or in the form of hard-wired components.

FIG. 11 illustrates an example of a system according to the invention. The system contains calculating means MC. The calculating means MC employ the method according to the invention to calculate transformed image ITR from digital image INUM, from the value VCV of the characteristic variables and from formatted information IF related to a geometric transformation, especially formatted information IF related to the distortions and/or chromatic aberrations of appliance chain P3.

The system may contain data-processing means MTI, especially for employing the method according to the invention for:

quantizing the digital positions in such a way as to obtain quantized digital positions, and/or correcting the chromatic aberrations by applying, to each color plane, a different geometric transformation, in order to combine the geometric transformation with another geometric transformation, especially a zoom effect, that varies depending on the digital image, determining the value VCV of the variable characteristics for the digital image in question, for example by using data registered in Exif format in the file containing digital image INUM, sorting the transformed positions.

Application of the Invention to Cost Reduction

Cost reduction is defined as a method and system for lowering the cost of an appliance P25 or of an appliance chain P3, especially the cost of the optical system of an appliance or of an appliance chain, the method consisting in:

reducing the number of lenses, and/or simplifying the shape of the lenses, and/or designing an optical system having defects P5 that are larger than those desired for the appliance or the appliance chain, or choosing the same from a catalog, and/or using materials, components, processing operations or manufacturing methods that are less costly for the appliance or the appliance chain and that add defects P5.

The method and system according to the invention can be used to lower the cost of an appliance or of an appliance chain: it is possible to design a digital optical system, to produce formatted information IF related to the defects P5 of the appliance or of the appliance chain, to use this formatted information to enable image-processing means, whether they are integrated or not, to modify the quality of images derived from or addressed to the appliance or to the appliance chain, in such a way that the combination of the appliance or the appliance chain with the image-processing means is capable of capturing, modifying or restituting images of the desired quality at reduced cost.

The invention claimed is:

1. A method for calculating a transformed image from a digital image and formatted information related to a geometric transformation, the formatted information being limited to defects of an appliance chain, the formatted information especially linked to distortions and/or to chromatic aberrations of the appliance chain, wherein the digital image is composed of digital pixels, the transformed image is composed of transformed pixels, and the transformed pixels are characterized by a transformed position and a transformed value, the method comprising:

calculating the transformed image from an approximation of the geometric transformation;

calculating values of the transformed pixels by employing a general algorithm that includes selecting the transformed pixels, to generate initial transformed pixels, obtaining blocks of initial digital pixels and initial digital positions by applying the following processes (a) a process of selecting, within the digital image, from the formatted information, for each transformed position, a block of digital pixels, (b) a process of calculating, from the formatted information, for each transformed position, a digital position within the block of digital pixels, (c) a process of calculating, for the transformed position, the value of the transformed pixel as a function of the values of the digital pixels of the block of digital pixels and of the digital position, and applying an optimized algorithm to each transformed pixel other than the initial transformed pixels, wherein the optimized algorithm includes the following processes (d) a process of selecting, from the initial digital blocks and/or from each initial transformed position, a block of digital pixels within the digital image, (e) a process of calculating, from the initial digital blocks and/or from each initial transformed position, a digital position within the block of digital pixels, (f) a process of calculating the value of the transformed pixel as a function of the values of the digital pixels of the block of digital pixels and of the digital position; and the formatted information containing parameters, the parameters making it possible to choose at least one mathematical function related to the geometric transformation, the at least one mathematical function making it possible to calculate the block of digital pixels and the digital position from the transformed position.

2. The method according to claim 1, wherein the method is employed with a hardware or a software processor, the optimized algorithm employing exclusively integral or fixed-point data.

3. The method according to claim 1, the method further comprising quantizing the digital positions to obtain quantized digital positions.

4. The method according to claim 3, the method further comprising calculating blocks of coefficients, the processes (c) and (f) being performed by:

using the quantized digital position to select a block of coefficients, calculating the value of the transformed pixel from the block of coefficients and from the block of digital pixels.

5. The method according to claim 1, wherein the processes (c) and (f) of calculation of the value of the transformed pixel are also applicable to a transformation other than the geometric transformation, and to attenuation of blurring of the image.

6. The method according to claim 1, wherein the digital image is derived from a sensor having a plurality of channels, the channels configured to be combined to produce color planes, the processes (c) and (f) for calculation of the value of the transformed pixel also making it possible to combine the channels to obtain the color planes.

7. The method according to to of claim 1, wherein the digital image is composed of color planes, and wherein in the method a different geometric transformation is applied to each color plane to correct chromatic aberrations.

8. The method according to claim 1, the method further comprising combining the geometric transformation with another geometric transformation, especially a zoom effect, that is variable depending on the digital image.

9. The method according to claim 1, wherein the formatted information depends on variable characteristics that depend on the digital image, especially a size of the digital image, the method further comprising:

determining the value of the variable characteristics for the digital image, the processes (a) and (b) using the formatted information depending on the value obtained for the variable characteristics;

wherein employment of the method for the formatted information depending on a variable characteristic reduces to employment of the method for formatted information that does not depend on any variable characteristic.

10. The method according to claim 1, wherein the formatted information is related to distortion defects and/or to chromatic aberrations of the appliance chain, the parameters being related to a measured field.

11. The method according to claim 1, wherein the transformed image exhibits a difference compared with the image obtained by application of the geometric transformation to the digital image, the method further comprising:

choosing a threshold;

choosing the general algorithm and/or the optimized algorithm and/or the initial transformed positions, such that the difference is below the threshold.

12. The method according to claim 3, the transformed image exhibits a difference compared with the image obtained by application of the geometric transformation to the digital image, the method further comprising:

choosing a threshold, choosing the general algorithm and/or the optimized algorithm and/or the initial transformed positions and/or the quantization of the quantized digital positions, such that the difference is below the threshold.

13. The method according to claim 1, the method further comprising sorting the transformed positions such that the blocks of digital pixels selected by the processes (a) and/or (d) have a specified average number of common digital pixels.

14. A system for calculating a transformed image from a digital image and formatted information related to a geometric transformation, the formatted information being limited to defects of an appliance chain, to distortions and/or to chromatic aberrations of an appliance chain, wherein the digital image is composed of digital pixels, the transformed image is composed of transformed pixels, and the transformed pixels are characterized by a transformed position and a transformed value, the system comprising:

calculating means for calculating the transformed image from an approximation of the geometric transformation, calculating means for calculating values of the transformed pixels by employing data-processing means provided with a general algorithm, the data-processing means configured to select the transformed pixels, to generate initial transformed pixels, to obtain blocks of initial digital pixels and initial digital positions by applying the following processes (a) a process of selecting, within the digital image, from the formatted information, for each transformed position, a block of digital pixels, (b) a process of calculating, from the formatted information, for each transformed position, a digital position within the block of digital pixels, (c) a process of calculating, for the transformed position, the value of the transformed pixel as a function of the values of the digital pixels of the block of digital pixels and of the digital position, and to apply an optimized algorithm to each transformed pixel other than the initial transformed pixels, wherein the optimized algorithm includes the following processes (d) a process of selecting, from the initial digital blocks and/or from each initial transformed position, a block of digital pixels within the digital image, (e) a process of calculating, from the initial digital blocks and/or from each initial transformed position, a digital position within the block of digital pixels, (f) a process of calculating the value of the transformed pixel as a function of the values of the digital pixels of the block of digital pixels and of the digital position; and the formatted information containing parameters, the parameters making it possible to choose at least one mathematical function related to the geometric transformation, the at least one mathematical function making it possible to calculate the block of digital pixels and the digital position from the transformed position.

15. The system according to claim 14, wherein the general algorithm or the optimized algorithm is executed by a hardware and/or software processor, the optimized algorithm employing exclusively integral or fixed-point data.

16. The system according to claim 14, wherein the data-processing means quantizes the digital positions to obtain quantized digital positions.

17. The system according to claim 16, the system further comprising calculating means for calculating blocks of coefficients, the processes (c) and (f) being performed by:

using the quantized digital position to select a block of coefficients, calculating the value of the transformed pixel from the block of coefficients and from the block of digital pixels.

18. The system according to claim 14, wherein the processes (c) and (f) of calculation of the value of the transformed pixel are also applicable to a transformation other than the geometric transformation, and to attenuation of blurring of the image.

19. The system according to claim 14, wherein the digital image is derived from a sensor having a plurality of channels, the channels configured to be combined to produce color planes, the processes (c) and (f) for calculation of the value of the transformed pixel being such that they also make it possible to combine the channels to obtain the color planes.

20. The system according to claim 14, wherein the digital image is composed of color planes, the system being such that the data-processing means is capable of applying a different geometric transformation to each color plane to correct chromatic aberrations.

21. The system according to claim 14, wherein in the system the data-processing means makes it possible to combine the geometric transformation with another geometric transformation, especially a zoom effect, that is variable depending on the digital image.

22. The system according to claim 14, wherein the formatted information depends on variable characteristics that depend on the digital image, especially a size of the digital image, wherein the data-processing means determines the value of the variable characteristics for the digital image, the processes (a) and (b) using the formatted information depending on the value obtained for the variable characteristics.

23. The system according to claim 14, wherein the formatted information is related to distortion defects and/or to chromatic aberrations of the appliance chain, the parameters being related to a measured field.

24. The system according to claim 14, wherein the transformed image exhibits a difference compared with the image obtained by application of the geometric transformation to the digital image, wherein the data-processing means makes it possible to employ the general algorithm and/or the optimized algorithm and/or the initial transformed positions such that the difference is below a chosen threshold.

25. The system according to of claim 16, wherein the transformed image exhibits a difference compared with the image obtained by application of the geometric transformation to the digital image, wherein the data-processing means makes it possible to employ the general algorithm and/or the optimized algorithm and/or the initial transformed positions and/or the quantization of quantized digital positions, such that the difference is below a chosen threshold.

26. The system according to claim 14, wherein the data-processing means sorts the transformed positions such that the blocks of digital pixels selected by the processes (a) and/or (d) have a specified average number of common digital pixels.

* * * * *